United States Patent Office 3,437,701
Patented Apr. 8, 1969

3,437,701
ALKYL ADAMANTANES
Eugene C. Capaldi, Broomall, Pa., assignor to Atlantic Richfield Company, Philadelphia, Pa., a corporation of Pennsylvania
No Drawing. Filed Nov. 30, 1967, Ser. No. 686,838
Int. Cl. C07c 3/18, 13/54
U.S. Cl. 260—666                 7 Claims

ABSTRACT OF THE DISCLOSURE

Novel compositions of matter comprising alkyl adamantanes useful as intermediates in the preparation of alkyl substituted adamantane derivative compounds such as, for example, epoxides of alkyl adamantanes and acrylates and methacrylates of alkyl adamantanes which are useful as intermediates in the preparation of polymers. The polymers are useful in making rubber-like compositions, crash pads, and protective coatings, etc.

A process for the preparation of alkyl adamantanes comprising contacting an adamantyl halide in the presence of a catalyst, with a material selected from the group consisting of substituted allyl halides and olefins in order to produce a material selected from the group consisting of adamantyl dihaloalkanes and adamantyl haloalkanes respectively and thereafter reducing said adamantyl dihloalkanes and said adamantyl haloalkanes in order to produce said alkyl adamantanes.

Background of invention

This invention relates to novel compositions of matter characterized by the formula

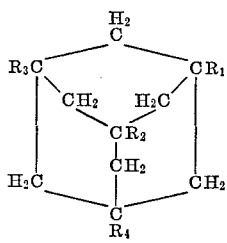

hereinafter referred to as

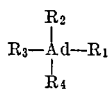

wherein Ad represents the adamantane nucleus, $R_1$ and $R_2$ attached to bridgehead carbon atoms are individually alkyl groups having from 1 to 10 carbon atoms, $R_3$ attached to a bridgehead carbon atom is selected from the group consisting of hydrogen and alkyl groups having from 1 to 10 carbon atoms and $R_4$ attached to a bridgehead carbon atom is an alkyl group having from 3 to 10 carbon atoms with the proviso that the total number of carbon atoms in said alkyl groups is not more than 20.

This invention also relates to the method of preparation of adamantane derivative compounds of the $C_{13}$–$C_{30}$ range having alkyl substituents. More particularly, this invention relates to the method of preparation of $C_{13}$–$C_{30}$ adamantane derivative compounds which have from 1 to 4 alkyl groups attached to bridgehead carbon atoms with the proviso that the total number of carbon atoms in said alkyl groups is not more than 20.

The carbon nucleus of adamantane contains 10 carbons arranged in a completely symmetrical, strainless manner such that there are three condensed 6-member rings and 4 bridgehead carbon atoms. The structure of adamantane ($C_{10}H_{16}$) is commonly depicted as follows:

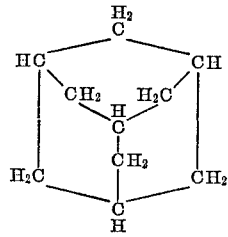

hereinafter referred to as

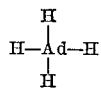

wherein Ad represents the adamantane nucleus.

The molecule contains four tertiary hydrogen atoms attached respectively at bridgehead carbon atoms. All four bridgehead carbons are equivalent to each other and likewise, all rings are equivalent.

Summary of invention

According to my invention I have now discovered a method for the preparation of alkyl adamantanes having from 1 to 4 alkyl substituents. I have discovered that the compounds produced in accordance with my invention can be obtained from adamantyl halides. In the method of my invention an adamantyl halide is caused to react in the presence of a catalyst with a material selected from the group consisting of substituted allyl halides and olefins. The adamantyl dihaloalkane and adamantyl haloalkane, respectively, thereby produced is then reduced in order to form the corresponding alkyl adamantane. Representative alkyl adamantanes that can be prepared in accordance with my invention are:

1-butyl adamantane
1-hexyl adamantane
1-octyl adamantane
1-decyl adamantane
1-ethyl-3-propyl adamantane
1-ethyl-3,5-dipropyl adamantane
1-methyl-3,5,7-tripropyl adamantane
1-heptyl-3-methyl adamantane
1-ethyl-3-octyl adamantane
1,3-dipentyl adamantane
1,3,5-trihexyl adamantane
1,3-dihexyl-5,7-dipropyl adamantane
1,3-diheptyl-5-butyl-7-ethyl adamantane Each of the above-named compounds is formed by the reduction of the corresponding adamantyl dihaloalkane or adamantyl haloalkane.

The alkyl adamantanes prepared in accordance with my invention have utility in the preparation of intermediates for use in the preparation of alkyl substituted adamantane derivative compounds such as, for example, epoxides of alkyl adamantanes and acrylates and methacrylates of alkyl adamantanes which are useful in the preparation of polymers. The polymers produced from the adamantyl compounds having alkyl substituents have greater stability with respect to oxidation resistance, thermal degradation, and the like as compared to polymers produced from adamantyl compounds which do not have alkyl substituents. The use of alkyl substituted adamantanes as intermediates in the preparation of epoxides of alkyl adamantanes is disclosed in the copending patent application of Borchert et al. entitled Adamantyl Epoxides, Ser. No. 686,842, filed concurrently herewith and incorporated herein by reference.

It is therefore an object of my invention to provide novel compositions of matter.

It is another object of my invention to provide a novel method for the preparation of alkyl adamantanes.

Other objects, advantages and features of my invention will be apparent to those skilled in the art without departing from the spirit and scope of my invention and it should be understood that the latter is not necessarily limited to the accompanying discussion.

In one aspect my invention relates to novel compositions of matter wherein said compositions are characterized by the formula

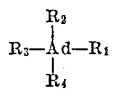

wherein Ad represents the adamantane nucleus, $R_1$ and $R_2$ are individually alkyl groups having from 1 to 10 carbon atoms, $R_3$ is selected from the group consisting of hydrogen and alkyl groups having from 1 to 10 carbon atoms and $R_4$ is an alkyl group having from 3 to 10 carbon atoms with the proviso that the total number of carbon atoms in said alkyl groups is not more than 20.

In another aspect my invention relates to a process for producing alkyl adamantanes comprising contacting an adamantyl halide having from 1 to 4 halogen substituents and from none to 3 alkyl substituents, each alkyl substituent having from 1 to 10 carbon atoms, in the presence of a Friedel-Crafts type catalyst with a material selected from the group consisting of substituted allyl halides and olefins in order to produce a material selected from the group consisting of adamantyl dihaloalkanes and adamantyl haloalkanes respectively and thereafter reducing said adamantyl dihaloalkanes and said adamantyl haloalkanes in order to produce said alkyl adamantanes having from 1 to 4 alkyl substituents.

Preferred embodiment

In accordance with the method of my invention an adamantyl halide such as for example, 1-halo adamantane; 1,3-dihalo adamantane; 1,3,5-trihalo adamantane and 1,3,5,7-tetrahalo adamantane wherein said halo substituent is selected from the group consisting of bromides and chlorides is reacted with a material selected from the group consisting of substituted allyl halides and olefins having from 3 to 10 carbon atoms. The reaction results in the formation of the corresponding adamantyl dihaloalkane and adamantyl haloalkane respectively. The adamantyl dihaloalkane and the adamantyl haloalkane produced is then reduced in order to form the corresponding alkyl adamantane.

The substituted allyl halide has the following characteristic formula

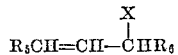

wherein X is a halogen selected from the group consisting of chlorine and bromine, preferably bromine, and $R_5$ and $R_6$ are individually selected from the group consisting of hydrogen and alkyl groups having from 1 to 7 carbon atoms. The olefin has the characteristic formula $$R_7CH=CH-CH_2R_8$$

wherein $R_7$ and $R_8$ are individually selected from the group consisting of hydrogen and alkyl groups having from 1 to 7 carbon atoms.

As starting halo adamantanes there can be utilized, if desired, halo adamantanes having at the remaining bridgehead positions of the adamantane nucleus from none to 3 methyl substituents, from none to 3 ethyl substituents and from none to 3 alkyl substituents, said alkyl substituents having from 3 to 10 carbon atoms. For example, the starting halo adamantane can be 1-bromo-3-methyl adamantane; 1-bromo-3,5-dimethyl adamantane; 1-bromo-3,5,7-trimethyl adamantane; 1-chloro-3-ethyl admantane; 1-chloro-3-ethyl-5-methyl adamantane; 1,3-dibromo-5,7-dimethyl adamantane or 1-bromo-3-ethyl-5-methyl-7-pentyl adamantane.

The method of my invention can be most readily understood by reference to the following equations, which are representative, wherein Ad, $R_4$, $R_5$, $R_6$, $R_7$, $R_8$ and X are the substituents as previously defined.

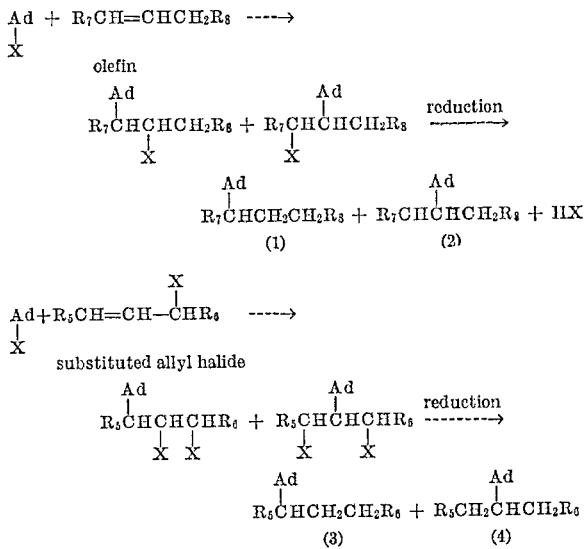

It will be apparent to those skilled in the art that the product distribution of the alkyl adamantanes, i.e., (1) and (2), and (3) and (4) will be dependent upon the structure of $R_7$ and $R_5$, respectively.

In accordance with my invention, there can be obtained alkyl adamantanes having from 1 to 4 alkyl substituents wherein each alkyl substituent has the same number or a different number of carbon atoms. For example, if a starting adamantyl halide such as 1,3,5-tribromo adamantane is reacted with propylene, the adamantyl haloalkane produced when subjected to reduction would result in the formation of 1,3,5-tripropyl adamantane. If, however, the starting material is 1-bromo adamantane, there would be produced upon reaction with propylene 1-adamantyl-2-bromopropane. The 1-adamantyl-2-bromopropane when reduced would result in the formation of 1-propyl adamantane. The 1-propyl adamantane can then be brominated in order to obtain 1-bromo-3-propyl adamantane which can be reacted, for example, with hexene and subsequently reduced to form 1-hexyl-3-propyl adamantane. The same procedure can, of course, be repeated to form other alkyl adamantanes such as, for example, 1-hexyl-3-pentyl-5-propyl adamantane; 1-butyl-3-heptyl-5-hexyl-7-propyl adamantane and 1,3-dimethtyl-5,7-dipropyl adamantane.

As can be seen by reference to a review article by H. Stetter appearing in Angew. Chemistry International Edition, vol. I (1962), No. 6, pages 286–298, the starting compounds and the methods for preparing the starting compounds for use in my invention, i.e., the methyl, ethyl and halo-substituted adamantanes are known in the art. The adamantyl bromides are preferred in the method of my invention. The adamantyl halides having methyl and ethyl substituents can be prepared by reacting the methyl and ethyl substituted adamantanes with either chlorine or bromine in the same maner as used to prepare adamantyl halides having no methyl or ethyl substituents. Di- and trisubstituted ethyl adamantanes can be prepared by methods known in the art, for example, in the preparation of disubstituted ethyl adamantane a 1,3-dibromo adamantane can be converted to a 1,3-(2,2-dibromoethyl) adamantane. The 1,3-(2,2-dibromoethyl) adamantane can then be converted to a (1,3-diethynyl) adamantane. The (1,3-diethynyl) adamantane can then be hydrogenated in order to obtain the 1,3-diethyl adamantane. The same procedure can be used for preparing the tri-substituted ethyl adamantane, i.e., 1,3,5-triethyl adamantane.

The reaction of the adamantyl halide with the material selected from the group consisting of substituted allyl halides and olefins is carried out in the presence of a catalyst. Particularly suitable and preferred catalysts are Friedel-Crafts type catalysts and boron trifluoride catalysts of the Friedel-Crafts type. Particular catalysts which can be used in effecting the interaction of the adamantyl halide with the substituted allyl halide and olefin include metal chlorides and bromides and particularly, chlorides of aluminum, iron (III), tin (IV) and zinc. Of these catalytic materials, aluminum chloride is preferred. The conditions of operation utilizable with the various catalysts can vary dependent upon the catalytic activity of the catalysts. Further, the catalytic materials can be used as such, or they can be composited with one another, or they can be deposited upon solid carriers or supporting materials to produce catalyst composites of desired activities. Catalyst carriers or supports include both adsorptive and substantially nonadsorptive materials including alumina, silica, activated charcoal, crushed porcelain, raw and acid-treated clays, diatomaceous earth, pumice, fire brick, etc. The carriers should be substantially inert in the sense that between catalyst and carrier substantially no interaction occurs which is detrimental to the activity or selectivity of the catalyst composite.

The reaction of the adamantyl halide with the substituted allyl halide or olefin can be carried out in either a batch or continuous type operation. A hydrogen halide such as hydrogen chloride or hydrogen bromide, can also be introduced to the reaction zone with the olefin and adamantyl halide. In a batch type operation, the desired proportion of the reactants are introduced into a suitable reactor containing a Friedel-Crafts type catalyst as such or composited with a carrier. The resultant comingled reactants are contacted until a substantial proportion of the reactants are converted into the desired adamantyl dihaloalkane or adamantyl haloalkane. After separation from the catalyst, the reaction mixture is fractionated to separate the unconverted reactants from the product. The recovered substituted allyl halide, olefin and adamantyl halide can then be reused in the process.

In a continuous operation, a mixture of the adamantyl halide and substituted allyl halide or olefin is directed through a reactor of suitable design containing a fixed bed of granular Friedel-Crafts type catalyst. In this type of treatment the operating conditions can be adjusted and can differ somewhat from those used in the batch process.

The reaction of thea damantyl halide with the material selected from the group consisting of substituted allyl halides and olefins is carried out in the presence of a substantially inert solvent which is in the liquid state at the conditions of temperature and pressure employed in the reaction. Suitable solvents are, for example, hydrocarbons such as hexane, pentane, etc. A particularly suitable and preferred solvent is carbon disulfide. The solvent chosen, of course, should be one which does not itself undergo undesirable reaction at the operating conditions employed.

The preferred operating conditions i.e., conditions of temperature and pressure, employed in the reaction of the adamantyl halide with the substituted allyl halide or olefin, depend upon several factors including the particular catalyst employed and composition of the starting compounds, i.e., the adamantyl halide, substituted allyl halide and olefin. The reaction can be generally carried out at a temperature of from less than about −70° C. to about +25° C. The pressure is suitably maintained to keep the reactants substantially in the liquid state.

The conversion of the adamantyl dihaloalkane and adamantyl haloalkane to the desired alkyl adamantane can be accomplished by any one of a number of methods in which a metal above hydrogen in the electromotive force series of elements is consumed, namely such metals as sodium, magnesium, aluminum, manganese, zinc, copper, iron, tin, etc. Preferred metals for the reaction are zinc, magnesium and sodium.

When employing zinc, the adamantyl dihaloalkane and adamantyl haloalkane can be treated in various ways, for example, with zinc and alcohol or a dilute alcohol; with zinc and alkali or acetic acid; with zinc and a mixture of sodium iodide and sodium carbonate in acetamide or alcohol; or with a zinc-copper couple in the presence of an alcohol.

When employing sodium the adamantyl dihaloalkane and adamantyl haloalkane is treated with sodium in liquid ammonia, or with sodium and an alcohol. Further, the adamantyl dihaloalkane and adamantyl haloalkane can, if desired be reacted with magnesium and an alcohol or a dilute alcohol.

The reaction can also be carried out in the presence of organo metallic hydrides such as, for example, tri-n-butyltin hydride, or if desired, the reduction can be carried out in the presence of metallic hydrides such as, for example, lithium aluminum hydride in a suitable solvent such as for example, tetrahydrofuran.

A particularly suitable and preferred method for the reduction comprises reacting the adamantyl haloalkane or adamantyl dihaloalkane with a Pd-$CaCO_3$ catalyst in the presence of a suitable solvent such as propyl alcohol. For example, $CaCO_3$ (50 grams freshly prepared) can be stirred in water (40 cc. at 80° C.), thereafter adding $PdCl_2$ (0.5 gram in 20 cc. of water) and then adding Formalin (2 cc. $CH_2O$ in 20 cc. water). After two minutes stirring, the dark solid obtained can be filtered off, washed with warm water, ethyl alcohol, and propyl alcohol and used immediately in the reaction with the adamantyl dihaloalkane or adamantyl haloalkane. Yields of the alkyl adamantane compounds are in excess of 10 percent.

The preferred operating conditions, i.e., conditions of temperature and pressure employed in the reduction reaction are dependent upon the composition of the adamantyl dihaloalkane and adamantyl haloalkane and the particular materials employed in effecting the reduction. The reduction reaction can be suitably carried out at a temperature in the range of from about −30° C. to about 60° C. The pressure is suitably maintained to keep the reactants substantially in the liquid state.

The following examples are specific illustrations of my invention.

Example I

To a solution of 21.5 grams (0.1 mole) of 1-bromo adamantane, 4.6 grams (0.11 mole) of propylene and 50 ml. of carbon disulfide at −70° C. there was slowly added 1.0 gram of aluminum chloride. When the addition was completed, the temperature was increased to −55° C. and maintained for one hour. The reaction mixture was then poured into ice water, extracted with ether and dried over magnesium sulfate. Distillation furnished a 90 percent yield of 1-(2-bromopropyl) adamantane. The 1-(2-bromopropyl) adamantane is reduced in the manner as hereinafter set forth.

$CaCO_3$ (50 gms. freshly prepared) is stirred in water (400 cc. at 80° C.), $PdCl_2$ (0.5 gm. in 20 cc. water) is added and then Formalin ($CH_2O$, 2 cc. in 20 cc. water) is added. After two minutes stirring, the dark solid obtained is filtered off, washed with warm water; ethyl alcohol and propyl alcohol and used immediately. The catalyst (25 grams), and KOH (3 grams in 20 cc. of propyl alcohol) is added to 1-(2-bromopropyl) adamantane (8 grams) in 30 cc. of propyl alcohol. The mixture is agitated in the presence of hydrogen for 2 hours at 20° C. The solution is removed from the catalyst by washing with propyl alcohol and then contacted with water. Separation and distillation furnishes 1-propyl adamantane free from bromine in a yield in excess of 30 percent.

Example II

To a solution of 21.5 grams (0.10 mole) of 1-bromo adamantane, 9.2 grams (0.11 mole) of 1-hexene and 50 ml. of carbon disulfide at −70° C. there was slowly added 1.0 gram of aluminum chloride. When the addition was completed, the temperature was increased to −55° C. and maintained for one hour. The reaction mixture was then poured into an ice water solution, extracted with ether and dried over magnesium sulfate. Distillation furnished a 90 percent yield of 1-(2-bromohexyl) adamantane. The 1-(2-bromohexyl) adamantane is reduced in the manner as hereinafter set forth.

$CaCO_3$ (50 grams freshly prepared) is stirred in water (400 cc. at 80° C.), $PdCl_2$ (0.5 gram in 20 cc. water) is added and then Formalin ($CH_2O$, 2 cc. in 20 cc. water) is added. After two minutes stirring, the dark solid obtained is filtered off, washed with warm water; ethyl alcohol and propyl alcohol and used immediately. The catalyst (25 grams), and KOH (3 grams in 20 cc. of propyl alcohol) is added to 1-(2-bromohexyl) adamantane (8 grams) in 30 cc. of propyl alcohol. The mixture is agitated in the presence of hydrogen for 2 hours at 20° C. The solution is removed from the catalyst by washing with propyl alcohol and then contacted with 9 cc. of water. 1-hexyl adamantane free from bromine in a yield in excess of 30 percent is obtained.

Example III

To a solution of 21.5 grams (0.1 mole) of 1-bromo adamantane (0.11 mole) of 1-decene and 50 ml. of carbon disulfide at −70° C. there was slowly added 1.0 gram of aluminum chloride. When the addition was completed, the temperature was increased to −55° C. and maintained for one hour. The reaction mixture was then poured into an ice water solution, extracted with ether and dried over magnesium sulfate. Distillation furnished a 90 percent yield of 1-(2-bromodecyl) admantane. The 1-(2-bromodecyl) admantane is reduced in the manner as hereinafter set forth.

$CaCO_3$ (50 grams freshly prepared) is stirred in water (400 cc. at 80° C.), $PdCl_2$ (0.5 gram in 20 cc. water) is added and then Formalin ($CH_2O$, 2 cc. in 20 cc. water) is added. After two minutes stirring, the dark solid obtained is filtered off, washed with warm water; ethyl alcohol and propyl alcohol and used immediately. The catalyst (25 grams), and KOH (3 grams in 20 cc. of propyl alcohol is added to 1-(2-bromodecyl) adamantane (8 grams) in 30 cc. of propyl alcohol. The mixture is agitated in the presence of hydrogen for 2 hours at 20° C. The solution is removed from the catalyst by washing with propyl alcohol and then contacted with 9 cc. water. 1-decyl adamantane free from bromine in a yield in excess of 30 percent is obtained.

Example IV

The 1-propyladamantane obtained from Example I is brominated in order to obtain 1-propyl-3-bromoadamantane. The 1-propyl-3-bromoadamantane is then reacted with 1-hexene and reduced in the manner as set forth in Example II. The product obtained is 1-propyl-3-hexyladamantane. The 1-propyl-3-hexyladamantane is then brominated in order to obtain 1-propyl-3-hexyl-5-bromoadamantane. The 1-propyl-3-hexyl-5-bromoadamantane is then reacted with 1-decene in the manner as set forth in Example III. The product obtained is 1-propyl-3-hexyl-5-decyladamantane. The yield is in excess of 30 percent.

Example V

The procedure of Example I is repeated, however, allyl bromide rather than propylene is reacted with 1-bromo-3-methyladamantane. 1-(2,3-dibromo propyl)-3-methyladamantane produced as the intermediate is then reduced in the manner as set forth in Example I. 1-propyl-3-methyladamantane is obtained in a yield in excess of 30 percent.

Example VI

The procedure of Example II is repeated, however, 3-bromo-1-hexene rather than 1-hexene is reacted with 1-bromo-3-methyladamantane. 1-(2,3-dibromo hexyl)-3-methyladamantane produced as the intermediate is then reduced in the manner as set forth in Example II. 1-hexyl-3-methyladamantane is obtained in a yield in excess of 30 percent.

Example VII

The procedure of Example III is repeated, however, 3-bromo-1-decene rather than 1-decene is reacted with the 1-bromo-3-methyladamantane. 1-(2,3-dibromo decyl)-3-methyladamantane produced as the intermediate is then reduced in the maner as set forth in Example III. 1-decyl-3-methyladamantane is obtained in a yield in excess of 30 percent.

Example VIII 1-propyl-3-methyladamantane obtained from Example V is brominated in order to obtain 1-propyl-3-methyl-5-bromoadamantane. The 1-propyl-3-methyl-5-bromoadamantane is then reacted with 3-bromo-1-hexane and reduced in the manner as set forth in Example VI. The product obtained is 1-propyl-3-methyl-5-hexyladamantane. The 1-propyl-3-methyl-5-hexyladamantane is then brominated in order to obtain 1-propyl-3-methyl-5-hexyl-7-bromoadamantane. The 1-propyl-3-methyl-5-hexyl-7-bromoadamantane is then reacted with 3-bromo-1-decene and reduced in the manner as set forth in Example VII. The product obtained is 1-propyl-3-methyl-5-hexyl-7-decyladamantane. The yield is in excess of 30 percent.

In each of the examples set forth, analysis of the products of the reaction is obtained through means of nuclear magnetic resonance, infrared, and elemental analysis. The analysis confirms the presence of the alkyl groups at the bridgehead positions of the adamantane nucleus.

The method of my invention is particularly suitable for the preparation of alkyl adamantane derivative compounds wherein the alkyl substituents are straight chain hydrocarbon radicals. However, it will be understood by those skilled in the art that the method as hereinabove set forth can be used in order to prepare alkyl adamantanes wherein the alkyl substituents are branched chain hydrocarbon radicals.

While my invention has been described in detailed examples with particular reference to specific embodiments, it will be appreciated that no unnecessary limitations are to be understood therefrom. The invention is not limited to the exact details shown and described, for obvious modifications will occur to those skilled in the art. The embodiments of the invention in which an exclusive property or privilege is claimed is defined as follows:

I claim:

1. A process for producing alkyl adamantanes comprising contacting an adamantyl halide selected from the group consisting of adamantyl bromide and adamantyl chloride having from 1 to 4 halogen substitutes and from none to 3 alkyl groups each alkyl group having from 1 to 10 carbon atoms with the proviso that the total number of carbon atoms in said alkyl groups is not more than 20 in the present of a Friedel-Crafts type catalyst with a material selected from the group consisting of substituted allyl halides selected from the group consisting of allyl bromide and allyl chloride and olefins in order to produce a material selected from the group consisting of adamantyl dihaloalkanes and adamantyl haloalkanes respectively and therefter reducing said adamantyl dihaloalkanes and said adamantyl haloalkanes in order to produce said alkyl adamantanes having from 1 to 4 alkyl substituents.

2. The process according to claim 1 wherein said contacting takes place in the presence of a solvent.

3. The process according to claim 2 wherein said halogen substituent is a bromide, and said substituted allyl halide is a substituted allyl bromide.

4. The process according to claim 2 wherein said Friedel-Crafts type catalyst is selected from the group consisting of aluminum chloride, iron (III) chloride, tin (IV) chloride, and zinc chloride.

5. The process according to claim 2 wherein said reducing takes place in the presence of a metal above hydrogen in the electromotive force series of elements.

6. The process according to claim 5 wherein said metal is selected from the group consisting of zinc, magnesium and sodium.

7. The process according to claim 5 wherein said reducing takes place in the presence of a Pd-$CaCO_3$ catalyst.

References Cited

UNITED STATES PATENTS

| | | | |
|---|---|---|---|
| 3,382,288 | 5/1968 | Schneider | 260—666 |
| 3,275,700 | 9/1966 | Janoski | 260—666 |
| 3,336,405 | 8/1967 | Schneider | 260—666 |
| 3,336,406 | 8/1967 | Schneider | 260—666 |
| 3,356,751 | 12/1967 | Schneider | 260—666 |

OTHER REFERENCES

A. Stetter: Ang. Chem., Int. Ed., vol. I, No. 6, pp. 286–298, 1962.

DELBERT E. GANTZ, *Primary Examiner.*

V. O'KEEFE, *Assistant Examiner.*